United States Patent [19]

Shoichi

[11] Patent Number: 5,708,808

[45] Date of Patent: Jan. 13, 1998

[54] METHOD AND APPARATUS FOR CONCURRENCY WITH CRITICAL REGIONS

[76] Inventor: Horio Shoichi, 5-1-12-308 Matsubacho, Kashiwa, Chiba, Japan, 277

[21] Appl. No.: 607,377

[22] Filed: Feb. 27, 1996

[51] Int. Cl.$^6$ .................................................. G06F 9/46
[52] U.S. Cl. ........................ 395/678; 395/673; 395/674; 395/677; 395/182.13; 395/681; 395/827; 395/840; 395/608; 395/609
[58] Field of Search ...................... 395/678, 673, 395/674, 677, 182.13, 681, 827, 840, 608, 609

[56] References Cited

U.S. PATENT DOCUMENTS

| | | | |
|---|---|---|---|
| 4,972,312 | 11/1990 | den Boef | 364/200 |
| 5,057,997 | 10/1991 | Chang et al. | 364/200 |
| 5,127,098 | 6/1992 | Rosenthal et al. | 395/650 |
| 5,428,779 | 6/1995 | Allegrucci et al. | 395/650 |

OTHER PUBLICATIONS

Norton Utilities Version 6 User's Guide, 1988–1991, Symantec Corporation pp. 18–9, 18–10.

*Primary Examiner*—Lucien U. Toplu

[57] ABSTRACT

Allows concurrency for user program and device operations for user program's device request (10), by returning immediately to user program (16) when device becomes busy (12), switching back to device driver (12) when the device becomes idle (19), and after device driver postprocessing, continue user program where interrupted (19).

This disclosure discusses various problems including synchronization associated to above method.

2 Claims, 7 Drawing Sheets

Fig.4
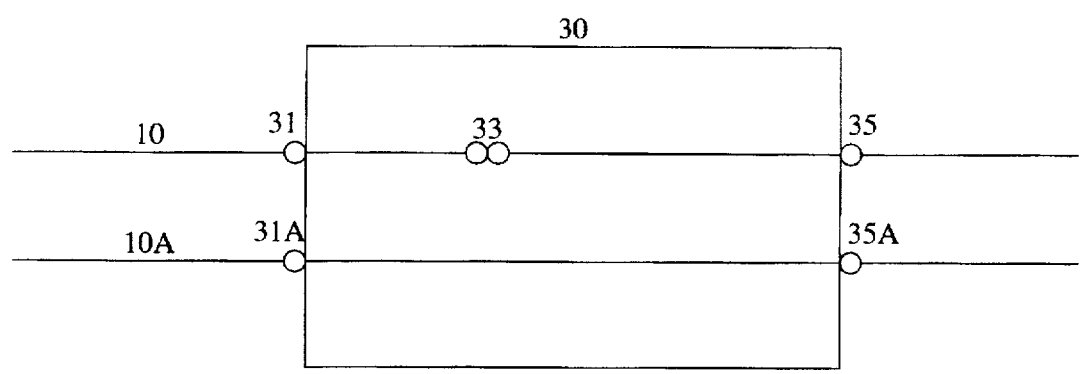
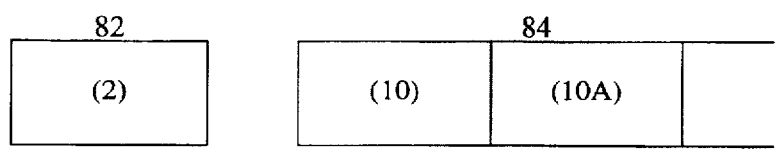

Fig.5
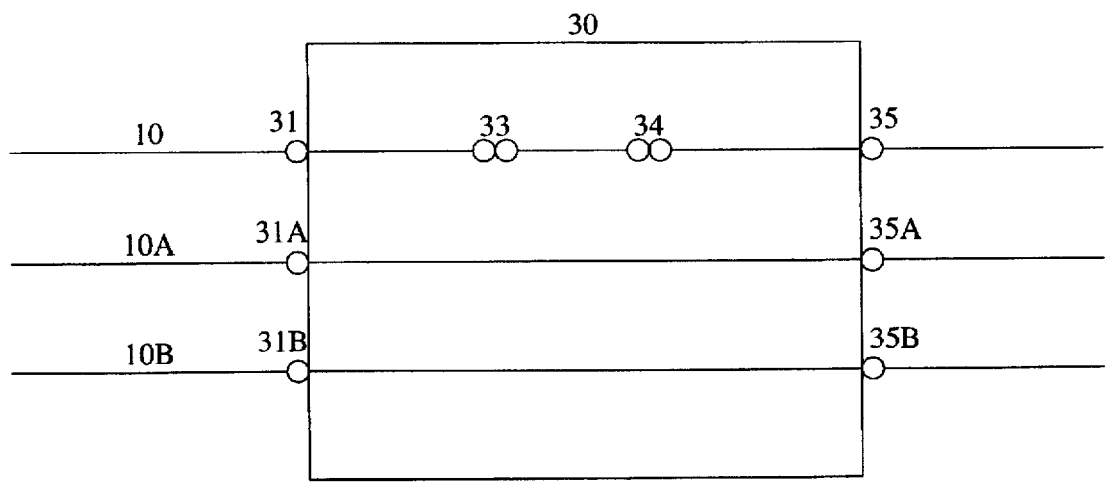
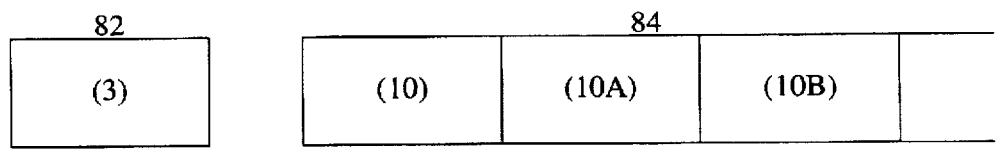

METHOD AND APPARATUS FOR CONCURRENCY WITH CRITICAL REGIONS

BACKGROUND—FIELD OF INVENTION

This invention relates to computer software, specifically to the method and apparatus of arbitrating device conflicts.

BACKGROUND—DESCRIPTION OF PRIOR ARTS

It is essential for performance to operate devices concurrently with each other and with application programs.

To permit such operations, a device needs to operate independently from central processing unit and a method, commonly implemented as interrupt, to actively notify their states to a central processing unit connected which is busy concentrating on the other matter. Upon detecting such notification, the cpu pays attention to the device, does some housekeeping to maintain device integrity, and finally allows the result of device operation to the concerned user program.

In addition, if multiple devices are operated, they must be coordinated to serialize the accesses to common data structures and common hardware devices.

Common practices

There are three well known methods related to these two problems.

Multitasking

The fundamental idea behind multitasking is to allow user programs run in front of busy devices, so that concurrency is genuine. It resolves device conflicts with its builtin locking mechanism, such as semaphores. This is most widely accepted, in varying degrees, solution to carry out the complex concurrency issues.

On the other hand, this method is slow in accepting new types of devices, and it places a big gap in resource requirements compared to above two methods. Thus the next two methods are still widely used.

Spin Lock

This method does not use the active notifications from device. Rather, it repeatedly scans device activities for its states.

Under this method the cpu concentrates basically on one device at a time or on an user program so that not to mention there are no concurrency but there are no device conflicts.

Most single tasking operating systems use this method.

Event Driven

In this method there is a monolithic central dispatching authority that maintains global state of the system, detecting requests to devices, their states, and calling functions appropriate to the global state of the system.

This method allows overlapping of input/output events each other and with the system's user programs. On the other hand, this method makes very difficult to maintain, modify, extend, and reuse the construction because whole the state is maintained centrally managed so that a small change in one small portion affects globally. In this method device conflicts are resolved in ad hoc ways.

Thus, this method is useful only in very small systems.

Specific techniques used

In this invention, two techniques available on multitasking systems are related.

Asynchronous Input/Output

Also called input/output buffering, this is a technique for overlapping input/output operations with program executions.

Mutual Exclusion Semaphore

This is an essential technique to control access to shared data between executing programs.

Inventor's own program

The inventor has posted a program using methods disclosed in this application first on Compuserve on Mar. 4th 1995. It is a disk caching program under MS/PC-DOS (DOS), a single tasking operating system. The program drives in parallel an ST-506 or IDE disk, a floppy, and multiple SCSI disks.

A similar program is known to the inventor; NCACHE from Symantec™ Corporation does overlapping disk operations under DOS by what it calls IntelliWrites in its manual.

OBJECTS AND ADVANTAGE

Several objects and advantages are, (a) to provide concurrency among devices and user programs, (b) to easily adapt almost any modern devices, (c) to provide small resource requirements, (d) to provide consistent and structured conflict resolution, for devices that allow detect when they become busy as well as when they become idle.

Further advantages are to allow coexistence with existing single or multitasking systems with small impacts on them, allowing fast context switching and to provide the unchanging interface to user programs.

As it turns out, this invention resembles multitasking in the operating multiple devices in parallel together with user programs. Unlike existing multitasking, this invention does not have scheduler components by which a ready process is chosen and made run from a ready list.

Using the analogy to multitasking, this invention is characterized by processes, or requests, are handled in nonpreemptive, basically first-in first-out manner, except that those generated by interrupts have highest priority until blocked. When a blocked request becomes ready to enter critical region the two contexts are directly switched, with later switching back again directly, rather than putting the request into ready list and then rescheduling using scheduler. This direct switching saves the need of repeated checking of critical region.

Put differently, scheduler component in multitasking is an active component searching for ready to run tasks, while in this invention requests switches context actively. For this reason, this invention can coexist with existing single- or multitasking systems. Also more than one embodiments of this invention may coexist in a system, in parallel or hierarchically interacting, each with its own definition of its context.

DRAWING FIGURES

FIG. 4 shows a control flow where one device request has entered a critical region, shown by rectangular box, and another device request demands the same critical region and the change of associated data.

FIG. 5 shows a control flow where one device request has entered a critical region, shown by rectangular box, and additional two device requests demanded the same critical region and the change of associated data.

REFERENCE NUMERALS

Following numerals show the points specific events have occurred on control flow.

| | |
|---|---|
| 10 | device request |
| 10A | another device request |
| 10B | yet another device request |
| 11 | switch to driver |
| 12 | device busy |
| 12A | second device busy |
| 12B | last device busy |
| 13 | switch back |
| 14 | device idle (alternate) |
| 14A | second idle (alternate) |
| 14B | last idle (alternate) |
| 15 | notify completion |
| 16 | user continuation |
| 16A | second user continuation |
| 16B | last user continuation |
| 17 | spin lock |
| 19 | device idle |
| 19A | last - 1 device idle |
| 19B | last device idle |
| 30 | critical region |
| 31 | entry to critical region 30 for request 10 |
| 31A | entry to critical region 30 for another request 10A |
| 31B | entry to critical region 30 for yet another request 10B |
| 33 | critical region 30 is interrupted and another device request 10A is generated |
| 34 | critical region 30 is interrupted and yet another device request 10B is generated |
| 35 | exit from critical region 30 for request 10 |
| 35A | exit from critical region 30 for another request 10A |
| 35B | exit from critical region 30 for yet another request 10B |

Following numerals show functions associated with control flow.

| | |
|---|---|
| 71 | switch_to_driver |
| 72 | device_busy |
| 73 | device_idle |
| 74 | lock |
| 75 | unlock |

Following numerals show data associated with control flow.

| | |
|---|---|
| 80 | request |
| 82 | request counter |
| 84 | request array |
| 85 | CR count |

Description of Control Flow For One Device

FIGS. 1, 2

Figure 1:
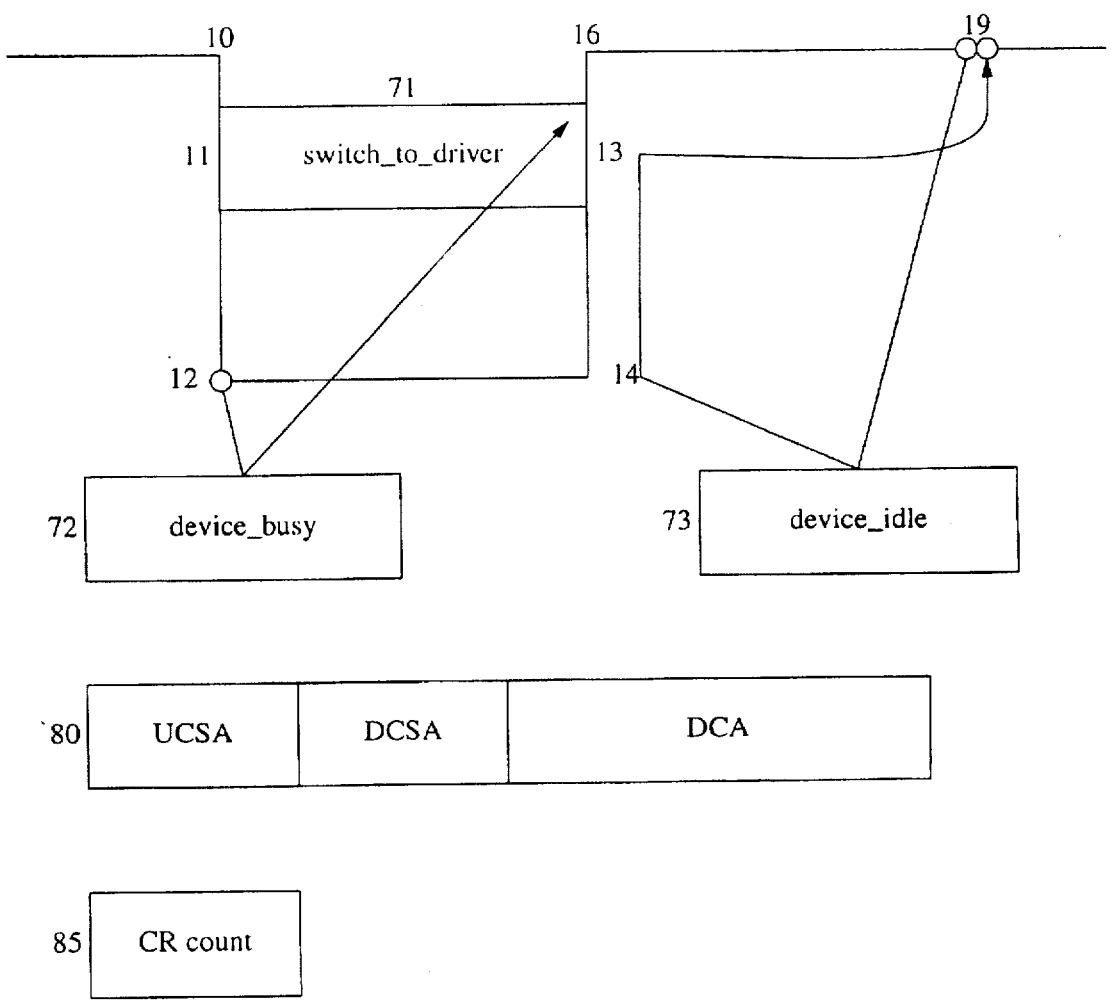
FIG. 1 shows a basic control flow related to a device request where at most one interrupt is generated and the associated request, critical region count, and two functions.

The basic control flow to let single device operate concurrently with user program is shown in FIG. 1. In FIG. 1, single interrupt is considered. Also in FIG. 1, device request 10 is assumed to be able to return without waiting for the completion of device actions.

If spin lock method is used, then an user program, running from left to right on top edge, calls the device driver at device request 10. The device request 10 proceeds several layers of device driver, reaches at bottom where device becomes busy at device busy 12, spin locks until the device becomes idle at device idle (alternate) 14, then returns the layers in reverse order back to user program at user continuation 16. Then user program continues to the right.

In multitasking systems cpu is switched to an user program, including the one requested, at device busy 12 and later switch back to device idle (alternate) 14, then the device has operated concurrently with user program.

To make effect similar to multitasking, control flow is switched at device busy 12 to user continuation 16. Then user program is eventually interrupted at the end of device operation at device idle 19, where control is switched back to device idle (alternate) 14 where, as spin lock would have, start postprocessing of device request 10. Control flow continues up toward user continuation 16, but goes back to device idle 19 after the postprocessing is completed.

To support the effect a request is associated with request 80, switch_to_driver 71 function, device_busy 72 function, and device_idle 73 function.

(a) The request 80 represent a device driver request and includes following data:

User Context Save Area (UCSA),

Driver Context Save Area (DCSA), and

Driver Context Area (DCA), where context area is a memory area to hold enough informations to continue program such as return addresses from function calls, parameters to the calls, and intermediate variables and their values for the functions, and context save area keeps cpu register values to restart program from content of context area.

DCA must be large enough to allow run driver code from 11 to 13 through 12 and 14. User context and driver context are saved into UCSA and DCSA, respectively.

(b) The switch_to_driver 71 function, inserted as a layer between driver request and its return, does following in this order:

increment CR count 85, save user context of return point of this function into UCSA (switch to driver 11), change to the driver context, call the lower layer of driver, and restore saved context from UCSA (switch back 13).

(c) The device_busy 72 function does following:

decrement CR count 85, save driver context of return point of this function into DCSA, and restore context from UCSA.

This function is called when device becomes busy, that is, when device operation is scheduled.

(d) The device_idle 73 function does following:

increment CR count 85, save user context of return point of this function into UCSA, and restore context from DCSA.

This function is called when device becomes idle, usually from device interrupt handler.

CR count is used to control the acceptability of new requests. If there is no need to consider the acceptability, CR count, together with operations on it shown above, can be omitted.

Figure 2:
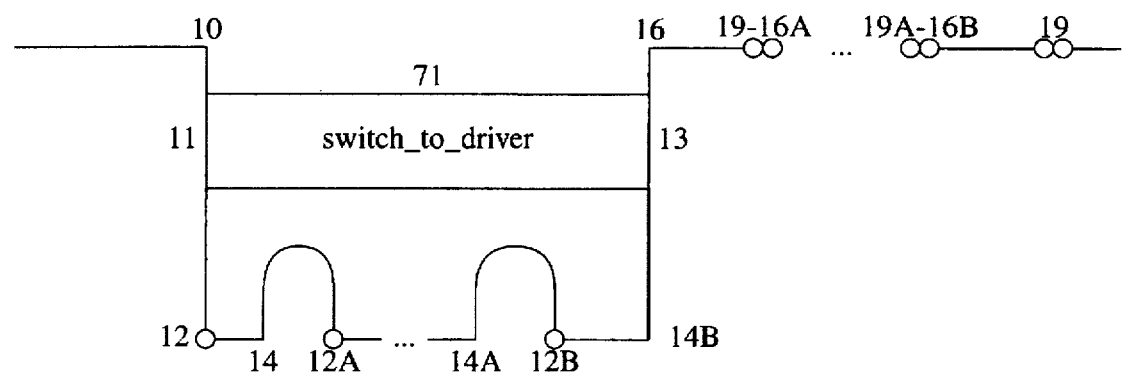
FIG. 2 shows a control flow related to a device request where multiple interrupts are generated.

FIG. 2 is an illustration of the case multiple device operations are performed and therefore device_busy 72 and device_idle 73 functions are called multiple times.

No additional data or functions are needed from FIG. 1. They are not shown in this figure.

In FIG. 2, device idle (alternate) 14 does not return to switch back 13 but starts additional device operations. When control flow reaches at device idle 12A, it calls device_busy 72 function as did at device busy 12, thus continues from device idle 19 which is now the second user continuation 16A. When device idle (not shown) control flow calls device_idle 73 as it did at device idle 19.

When control flow decides device operations are complete at the last device idle 14B, it goes back to switch_to_driver 71 function.

The function device_busy 72 function is called at each device busy 12, 12A, . . . , 12B and each such call continues user program from corresponding user continuation 16, 16A, . . . , 16B.

The function device_idle 73 function is called at each device idle 19, . . . , 19A, 19B and each such call continues device driver from corresponding device idle (alternate) 14, . . . , 14A, 14B.

User continuations except the first one is the right point of previous device idle 19, . . . , 19A, respectively.

Description

FIGS. 3–5

In this section device requests 10, 10A, and 10B have called switch_to_driver 71 function before calling lock 74 function and return to switch_to_driver 71 function after return from unlock 75 function.

When more than one device requests are issued, including the case for requests on the same device, often there are cases some data must be serially accessed. FIGS. 4 nd 5 show such case, where critical region 30 is control flow range for data to be protected.

The critical region 30 is associated with request counter 82, request array 84, lock 74 function called at CR entry 31, and, unlock 75 function called at CR exit 35.

(a) The request counter 82 counts the requests that called lock 74 function.

(b) The request array 84 stores identifiers of requests that called lock 74 function. Request counter 82 contains number of elements of this array.

(c) The lock 74 function does following:

increment request counter 82, append identifier for device request 10 to request array 84, and then if the device request 10 is not the first in request array 84, then call device_busy 72 function.

This function is called by every request that enters a critical region.

(d) The unlock 75 function does following:

decrement request counter 82, remove identifier for device request 10 from request array 84, and then if request array 84 does not become void, then call device_idle 73 function for one of remaining requests in request array 84.

This function is called by every request that exits a critical region.

The request counter 82 and request array 84, together with lock 72 and unlock 75, implements mutual exclusion (mutex) semaphore for requests over critical region 30.

Figure 3:
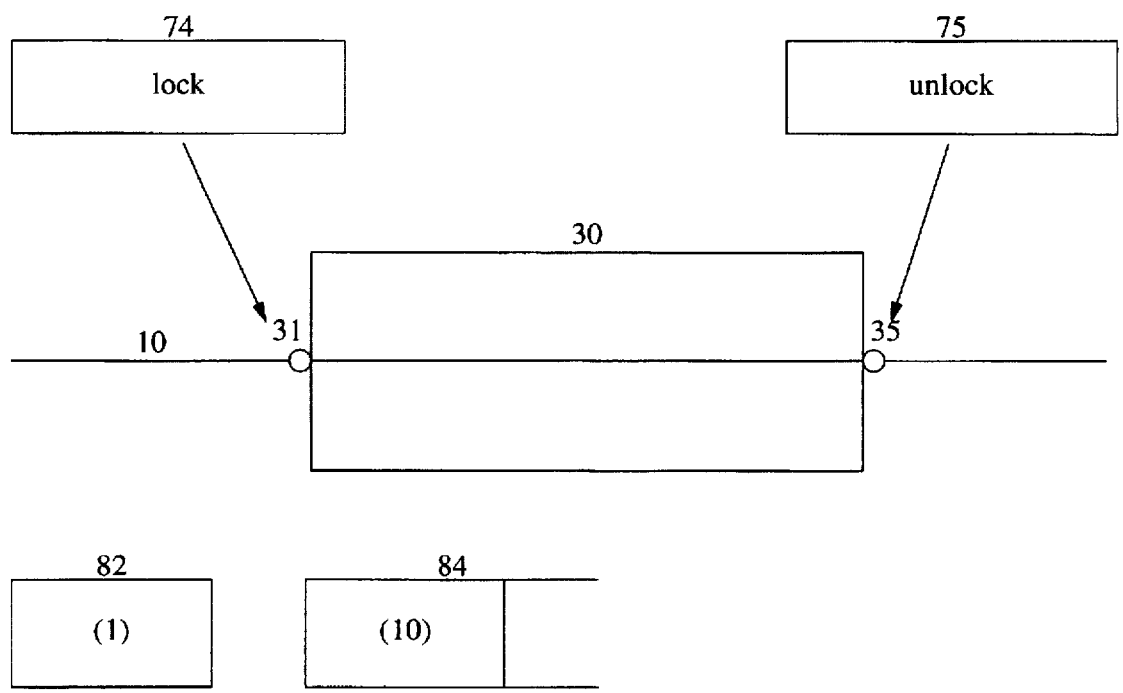
FIG. 3 shows a control flow where one device request has entered a critical region, shown by rectangular box, but has not exited from critical region and the associated data and two functions.
Figure 6:
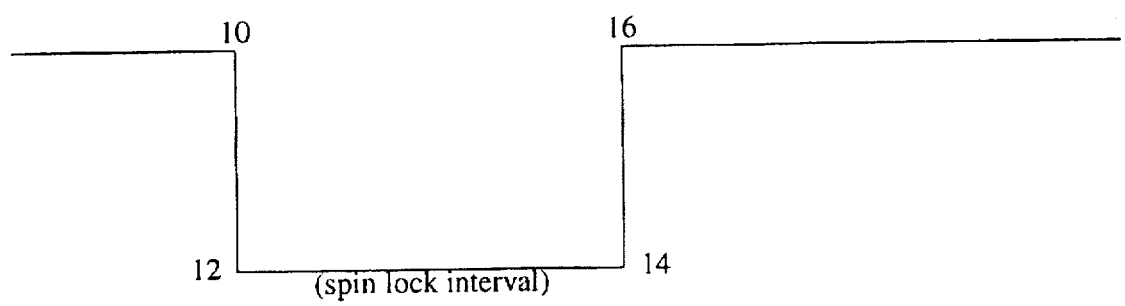
FIG. 6 is an illustration of the prior art.

FIG. 3 shows control flow of a device request 10 that proceeds from left to right, where the control flow calls lock 74 function at CR entry 31, and calls unlock 75 function at CR exit 35.

The content of request array 84 is the identifier of device request 10, what is in while the control flow is between CR entry 31 and CR exit 35, so it has one member 10, and the content of request counter 82 is one. The request array 84 are void while the control flow is outside of the interval.

The device request 10 must be executed in the order left of CR entry 31, 31–35, and right of CR exit 35.

FIG. 4 shows the control flow of two device requests 10 and 10A are to enter the critical region 30. The device request 10A calls lock 74 function at CR entry 31A and calls unlock 75 function at CR exit 35A. FIG. 4 shows the instance where a new device request 10A is generated when control flow of device request 10 at new request 33 and device request 10A has called lock 74 function. The content of request array 84 is the identifiers of device request 10 and 10A, what are in while the control flow of device request 10 is between CR entry 31 and CR exit 35, so it has two members, and the content of request counter 82 is two. The new request 33 is anywhere the control flow of device request 10 is between CR entry 31 and CR exit 35.

The device request 10A must be executed in the order left of CR entry 31A, 31A–35A, and right of CR exit 35A.

FIG. 5 shows the control flow of three device requests 10, 10A, and 10B are to enter the critical region 30. The device request 10B calls lock 74 function at CR entry 31A and calls unlock 75 function at CR exit 35A. FIG. 5 shows the instance where, in addition to device requests 10 and 10A as in FIG. 4, yet another device request 10B is generated when control flow of device request 10 at new request 34 and device request 10B has called lock 74 function. The content of request array 84 is the identifier of device request 10, 10A, and 10B, what are in while the control flow of device request 10 is between CR entry 31 and CR exit 35, so it has three members, and the content of request counter 82 is three. The new request 34 is anywhere the control flow of device request 10 is between new request 33 and CR exit 35.

The device request 10B must be executed in the order left of CR entry 31B, 31B–35B, and right of CR exit 35B.

Operation of a Request

FIGS. 1, 2

The control flow of a request for single device is described in three cases.

Case 1—device_busy 72 function is not called

If for any reason device_busy 72 function is not called by a request that fallen down switch_to_driver 71 and the control flow return back to switch_to_driver 71 function, then switch back 13 restores the context to the function exit point from UCSA. Thus control flow goes back to user continuation 16. This case is is a trivial one.

Case 2—device_busy 72 function is called exactly once

FIG. 1 shows the case device_busy 72 function is called by control flow of request 10 exactly once. The sequence of events on control flow is as shown below.

(a) User context is saved into UCSA of request 80 at switch to driver 11 in switch_to_driver 71 function, which also switches context to driver context and calls device driver.

(b) Device_busy 72 function is called at device busy 12. This causes i. save context into DCSA, and ii. restore context from UCSA, saved in switch_to_driver 71 function.

(c) This restoration causes the control flow return from switch_to_driver 71 function and leads it to user continuation 16 and then let it continue the user program.

(d) Eventually, device idle 19 is reached and device_idle 73 function is called. This causes i. save user context into UCSA, and ii. restore driver context from DCSA, saved in device_busy 72 function.

(e) This restoration causes the control flow to return from device_busy 72 function, and let it continue along the bottom line of FIG. 1 to device idle (alternate) 14. Since the bottom line is a spin lock, control flow moves from device busy 12 to device idle 14 immediately.

(f) control flow climbs up the later part of device driver and returns to switch_to_driver 71 function.

(g) At switch back 13 in switch_to_driver 71 function, context is restored from UCSA saved in device_idle 73 function. This causes control flow the return from device_idle 73 function so that control flow extends from device idle 19 to the right.

Case 3—device_busy 72 function is called more than once

In FIG. 2 control flow does not go back to switch_to_driver 71 function but rather additionally operates the device and calls device_busy 72 at the second device busy 12A. This sets DCSA and restores context from UCSA so that control flow continues device idle 19, which is user continuation 16A.

At the next device idle (not shown), device_idle 73 function is called, that sets user context in UCSA and restore driver context from DCSA. This returns control flow to the exit point of device_busy 72 function and the succeeding spin lock immediately terminates as seen in case 2.

By calling device_busy 72 function at the last device busy 12B, DCSA is saved with context and context is restored from UCSA saved by device_idle 73 function called at device idle 19A. At the last device idle 19B device_idle 73 function is called which sets UCSA and context is restored from DCSA saved immediately above. The last device idle (alternate) 14B is reached, which leads the control flow to return to switch_to_driver 71 function, where at switch back 13 context is restored from UCSA just set. Thus the control flow continues to the right of last device idle 19B.

With consideration of these three cases, control flow of a request for any number of device_busy 72 call is shown to complete a device request and user program continues by induction.

The assumption request is able to return without waiting for the completion of device actions allows parallel operations of user program and device. If a request is generated in an interrupt handier, then the control flow returns from interrupt handler so that requests are generated and processed to their ends with little impacts on interrupted user program.

Operations of Critical Region

FIGS. 3, 4, 5

Operations on critical regions are described in two steps.

Case 1—single critical region

First, the behavior of control flow on a single critical region is considered. For simplicity control flows of requests 10A and 10B do not call device_busy 72 function when they reach at CR entry 31A and 31B, respectively.

In FIG. 3 device request 10 leaves its identifier at CR entry 31 and removes it at CR exit 35. This first element of request array 84 serves as the sign that the request array 84 is not void. As in FIGS. 4 and 5, the first element is only removed, but not used in any other ways.

In FIG. 4 the sequence of control flow is as follows (a) The device request 10 has saved its user context into UCSA (not shown in this figure) before it reaches at CR entry 31.

(b) A new device request 10A is generated at new request 33. Let's say user program and driver context save areas of this device request (not shown) UCSA-A and DCSA-A respectively. This device request saves its user context in UCSA-A when it called switch_to_driver 71 function.

(c) The device request 10A reaches at CR entry 31A and calls lock 74 function. This appends identifier for device request 10A after that of device request 10 in request array 84 and since the request is not the first on the request array 84 device_busy 72 function is called which saves driver context into DCSA-A and restores user context from UCSA-A.

(d) The restoration of context from DCSA-A done above makes control flow of device request 10A return from switch_to_driver 71 function thus device request 10A returns.

(e) Request 10 proceeds to CR exit 35 and calls unlock 75 function. The device request 10 is removed from request array 84.

(f) Since the request array 84 is not void, UCSA-A is saved and context is restored from DCSA-A.

(g) The control flow of device request 10A resumes from CR entry 31A and reaches at CR exit 35A, where unlock 75 function is called.

(h) Request 10A is removed from request array 84. Since request array 84 is now void, the control flow returns to switch_to_driver 71 function.

(i) At switch back 13 in switch_to_driver 71 function user context is restored from UCSA-A saved by unlock 74 function. This causes control flow of device request 10 continue from CR exit 35.

On single processor with no multitasking the only way to cause (b)–(d) above is by an interrupt at new request 33. In this case device request 10 proceeds from new request 33 to the right after return of the interrupt that generated device request 10A.

Case 2—multiple critical regions

Next, the case when critical regions are nested is described. If device request 10A is blocked somewhere between CR entry 31A and CR exit 35A by another critical region (not shown), then the control flow is returned back to CR exit 35 saving the driver context into DCSA of device request 10A and reloading the user context from its UCSA, just in the same way when device request 10A is blocked by critical region 30. the control flow continues from the right of CR exit 35. At this instance, both critical regions are in the state any other request will be blocked on trying to enter either of critical regions. CR exit 35A is reached after another critical region is exited. From CR exit 35A control flow goes to the right of CR exit 35A.

From this observation, control flows for device request 10 and device request 10A are processed as required respectively and the critical region 30 is serially accessed.

In FIG. 5 there are two candidate remaining device requests 10A and 10B at CR exit 35. The execution order after CR exit 35 is either 31A–35A, 31B–35B, right of CR exit 35B, right of CR exit 35A, and right of CR exit 35 or 31B–35B, 31A–35A, right of CR exit 35A, right of CR exit 35B, and right of CR exit 35, depending on the choosing of device request 10A or 10B at CR exit 35. All requests 10, 10A, and 10B have control flow as required in either case and critical region 30 is accessed serially in either case.

If multiple requests are blocked usually the next request on array is chosen from blocked request. From the observation on FIG. 5 it is shown the order is irrelevant to operate correctly for cases up to three requests are involved.

However, it is easy to see choosing any request from request array 84 with any number of remaining requests makes each request executed in proper order and critical region 30 is serially accessed.

It is now fairly obvious for cases there are other critical regions (not shown) on the left or right sides of critical region 30; when a request of control flow meets one of these critical regions, its driver context is saved into its own DCSA and user context is restored from its own UCSA; that is, context is switched back to its previous request.

Operation On The Nature Of Request

FIGS. 1, 1A, 3

Figure 1A:
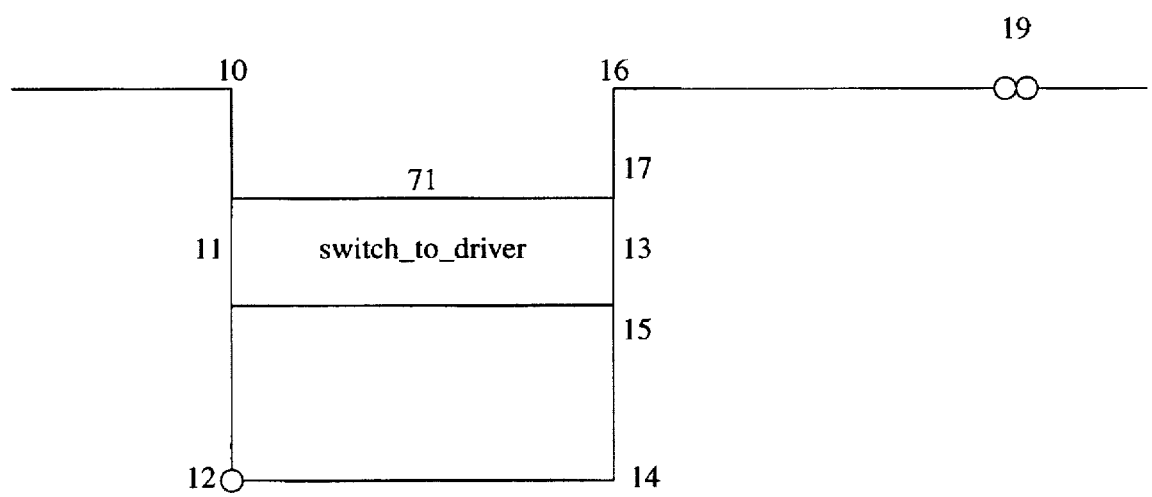
FIG. 1A is a variation of FIG. 1 to show control points when user program must await completion of device operation.

In FIG. 1 the request is assumed to be able to return without waiting for the completion of device actions. If this is not the case, as in FIG. 1A, inserting a spin lock 17 after return from switch_to_driver 71 function which monitors the completion condition set at notify completion 15 on return to switch_to_driver 71 function guarantees the completion at user continuation 16. The spin lock 17 replaces the interval user continuation 16 - device idle 19 in FIG. 1.

Applying this spin lock method can be improper for device request 10A on FIG. 4, since if device request 10A spin locks then single processor with no multitasking may not pass control back to new request 33, causing deadlock. A sufficient condition to detect the possibility of this type of deadlocks is described below. Deadlocks such as double locking of same critical region by a request or cross locking are not considered.

If the array for a critical region is not void, then the critical region is said locking critical region, the top element of the array is said blocking request, and the remaining elements are said blocked requests. A blocked request is said to progress if it proceeds to the right of its CR entry 31, that is it has been converted to a blocking request. If the blocking request of a locking critical region has last called device_busy 72 function but not corresponding device_idle 73 function yet then the locking critical region is said eventually unlockable critical region (EUCR).

If a request is blocked by an EUCR, then the blocking request eventually calls device_idle 73 function at its device idle. Then the blocking request, if it does not meet another locking critical region, executes its CR exit 35 so that requests blocked by this EUCR can progress.

So, if all locking critical regions are EUCR then all blocked requests can progress, since if a blocking request is blocked it is by another EUCR.

Further, if a request blocked by an EUCR has locked a critical region (not shown), and another request is blocked by this latter critical region, then it is clear both requests can progress.

Since a request blocked by this latter locking critical region may further have locked yet another critical region, and so on, closure of such critical regions starting from EUCRs can be calculated. If all locking critical regions belong to the closure, clearly there is no deadlock of above described type. If this condition holds then critical regions are said to be safe. To see if this is the case, count all settings into UCSA in switch_to_driver 71, device_idle 73, and unlock 75 functions, and count all settings into DCSA in device_busy 72 and lock 74 functions, and add the count of passing switch back 13 in switch_to_driver function.

If the two counts equal then critical regions are safe.

Operation Synchronizing External Events

FIG. 3

In some situations, synchronization with external events may be necessary. This means external events must establish mutual exclusion in the same way as described above. If the start and end of external events' critical region can be known, then following technique works.

At the receiving of start and end, regard them as requests that lock or unlock an object respectively. Make sure the requests complete by spin lock method described as in FIG. 1A. Then create a request that simply calls lock 74 or unlock 75 function for the object according to the start or end and return.

If the request for locking the object is not blocked then the request proceeds as in FIG. 3 but returns without reaching at CR exit 35. In this case the request has returned to the requester, the external event, leaving the footprint that the critical region is locking. The other requests will be blocked by this footprint.

When the request for unlocking arrived, the control flow for the request simply reaches at CR exit 35 and, if there is no blocked requests on the critical region, then it simply returns to the external events; otherwise, as in FIG. 4, switchings to the blocked requests occur as described below, and then control flow is returned. Note that the footprint critical region is locked is only removed but not used.

If the request for locking the object is blocked as device request 12A in FIG. 5, then the request spin locks at its spin lock (not shown).

Ramifications

FIGS. 1, 3

This section describes major ramifications on operations and associated data and functions
Sharing Functions Functions device_busy 72 and device_idle 73 are described as specific to respective requests but they may be shared among requests passing the request as a parameter to the functions.

Similarly, functions lock 74 and unlock 75 are described as specific to respective critical region but they may be shared among critical regions passing the critical region as a parameter to the functions.

Also, functions device_busy 72 and part of lock 74 have strong similarity so that the code may be shared and functions device_idle 73 and part of unlock 75 functions have strong similarity so that the code may be shared.
Refining request 80

As DCSA and UCSA in request 80 is never used at the same time and due to symmetry of functions device_busy 72 and device_idle 73 functions to access the data, DCSA and UCSA can be a single data, depending on number of registers to be saved and restored and the complexity of setting and restoring.

Refining request counter 82 and request array 84
Here are example alternatives for the data.
(i) eliminate first non-blocking request to the request array 84, as it is obvious,
(ii) merge all arrays of critical regions to conserve space in any format convenient,
(iii) make request counter the top of requests and use chain of blocked requests instead of array.

Usages of CR count 85
CR count 85 can be used in two ways.
As a global flag; if the value is is non-zero then a new request can potentially deadlock.
As the flag to broadcast that warns potential deadlock; device_busy 72 and device_idle 73 functions can see if the value becomes or non-zero respectively. If such is the case then each function can broadcast the conditions.

A finer closure calculation
The calculation of closure given in previous section is non-optimal because the method counts the interval no requests have entered critical region. The calculation can be more precise by following way.
Define a global lock counter (GLC), and define a local lock counter (LLC) for every request.
At the return from lock 73 function, increment LLC for the related request and GLC, and at the entry to unlock 74 function, decrement LLC for the related request and GLC.
At the entry to device_busy subtract LLC from GLC, and at the entry to device_idle add LLC to GLC.
If the result is zero, then critical regions are safe. However, if this fine control of closure calculation results in heavy overhead, as in broadcasting in previous subsection, then non-optimal calculation would be preferred.

Selection of blocked request
A blocking request can select any of blocked requests at CR exit 35. This means if a priority is encoded on requests then a selection is possible according to the priority.
This still limits the selection among blocked requests; even if the blocking request has the highest priority, it has to yield cpu. One method to overcome this problem is to postpone switching in the following way;
select the highest priority request from blocked requests,
insert the selected request into a pool of to-be-ready request list, keeping it in blocked request array of the critical region (important, since this ensures the critical region is still locking),
at the calling of device_busy 72 function, select a request from to-be-ready list,
Whether switching should be done at switch back does not matter. However, if requests on to-be-ready list are left over, other means to let them have the chance to run must be provided, since it may keep the critical region locking unduly long.
Instead of making up a to-be-ready request list, constructing to-be-ready critical region list can further improve priority sensitivity, since new high priority requests, generated from interrupts for example, can be blocked on critical region having postponed request.

A Concrete Example

FIGS. 1, 3

This section gives a concrete example. It is written in C language and uses setjmp( ) and longjmp( ) functions for context switch from C standard library. Error checking and statistical codes are not shown, however.
All elements described above
First, all elements which are common to utilization of this invention are given here.

request 80
```
#include <setjmp.h>
#define DCASIZE 512 /* size of DCA */
strict req {
    short flag; /* set if operation complete */
    jmp_buf UCSA; /* user context save */
    jmp_buf DCSA; /* driver context save */
    char DCA[DCASIZE]; /* driver context */
};
```
Here, context is defined to be enough informations to continue as a C program. This structure is used to allocate a space for each request 80 and referenced as a parameter for each following functions.
This req structure is allocated per device request and delivered to functions below.
The flag is a member used by functions below to indicate if the area allocated for req structure is being used or not.

CR count 85

```
int CR_count;
```

This is a global variable that is seen by all elements in the system. If this variable is zero the critical regions are safe; otherwise there is a potential danger deadlock may result single processor with no multitasking.

switch_to_driver 71 function
```
void switch_to_driver(struct req *r, int devid) {
    r->flag=1; /* mark req space busy */
    CR_count++;
    if (setjmp(r->UCSA)) {/* switch to driver 11 */
        CR_count--;
        return;
    }
    set_context(r->DCA);
    call_driver(devid);
    r->flag=0; /* mark req space free */
    longjmp(r->UCSA); /* switch back 13 */
```
Here,
i. set_context( ) (not shown) sets the context to specified context area. If the machine is stack oriented and the stack grows downward, this is simply to set stack pointer to the bottom of given area,
ii. call_driver( ) function (explained below) is to perform device specific operations on given device, and
iii. devid is the identifier of device to operate.

device_busy 72 function
```
int device_busy(struct req *r) {
    int retstat;
    if (!(retstat=setjmp(r->DCSA)))
        longjmp(r->UCSA, 1);
    return retstat;
}
```
This function returns a value received from device_idle( ) function.

device_idle 73 function
```
void device_idle(struct req *r, int retstat) {
    if (!CR_count++)
        broadcast_critical( );
    if (!setjmp(r->UCSA))
        longjmp(r->DCSA, retstat);
```

```
        if (!--CR_count)
            broadcast_noncritical( );
    }
```
Here are two ramifications;
[1] if CR_count becomes non-zero then broadcast that the program has entered an unsafe state, which may cause a deadlock, and if CR_count becomes zero then broadcast that the program is now in safe state,
[2] it passes a device state obtainable from lower level interrupt handier to the function device_busy( ), which in turn will be passed to the device driver portion that notified device has been idle.

request counter 82 and request array 84
```
        struct cr {
            int *lock_ct; /* identify critical region*/
            Struct req *blocked; /* request blocked by cr */
        };
        struct cr *req_array[MAXREQ]; /* array of requests */
```
Each critical region is allocated an integer to count requests that try to enter critical region. Request array 84 is merged to conserve memory, and each array element has a pointer to structure cr.

lock 74 function
```
        void keep_blocked_req(struct req *, int *);
        void lock(struct req *r, int *m) {
            if (!(*m)++)
                return;
            keep_blocked_req(r, m);
            device_busy(r);
        }
```
Here,
i. r is the request going to acquire critical region m,
ii. keep_blocked_req( ) is a function to keep the pair (r, m) into req_array.

unlock 75 function
```
        struct req *find_blocked_req(int *m);
        void unlock(int *m) {
            if (!--*m)
                return;
            device_idle(find_blocked_req(m));
        }
```
Here,
i. m is the critical region unlocked, and
ii. find_blocked_req( ) removes and returns one of requests from req_array kept by keep_blocked_req( ) function.

Usages of functions

This subsection describes practical usages as adopted by a disk cache program for DOS.

Devices in concern are driven by DOS block mode device driver, which in turn calls BIOS for IDE disks and floppies or calls SCSI manager for SCSI disks.

Mode of operation—operation of disk cache: The program intercepts DOS device driver for user's disk requests. For read requests the program passes cached data or does actual read to designated disk via DOS device driver. For write requests the program keeps the data to be written into a buffer which must be written afterwards when several timer interrupts occurred.

i. When user calls for disk operation the program allocates request space allocated by allocate_req_space( ) function with device identifier devid known, as follows.
```
        struct req *allocate_req_space( );
        struct req *r;
```
```
        switch_to_driver(r=allocate_req_space( ), devid);
        while (r->flag);
```
ii. When timer interrupt determines to write back it calls switch_to_driver( ) function as follows, call DOS device driver it does not need to await the completion so it calls DOS device driver as follows.

switch_to_driver(allocate_req_space( ), devid);

The function allocate_req_space( ) returns by searching for req area for one of those flag value is zero.

Call driver( )function: The call_driver( ) function is called from switch_to_driver( ) function. It locks cache control area with lock( ) function to retrieve cached data, which is later released by unlock( ) function.

If it needs to call DOS device driver, the program has intercepted it also locks device driver and the disk in concern (critical regions are represented by an int variable) to prevent from operating the disk more than at once. The critical regions are unlocked after return from DOS device driver.

Device busy: Device busy states are notified by either int 15h, ah=90h for IDE disks and floppy, or return from SCSI manager that passes SCSI packet to SCSI disk. When the notification is done device_busy( ) function is called by identifying the device to find associated request.

Device idle: Device idle states are notified by either int 15h, ah=91h for IDE disks and floppy, or command posing feature SCSI manager does when disk operation is complete. When the notification is done device_idle( ) function is called by identifying the device to find associated request.

Conclusion

The workings of this invention are made clear.

This invention efficiently operates multiple devices in parallel together with user programs.

The invention has a broad application areas; for example,
(a) in a small embedded system where no operating system supports are provided,
(b) in multitasking systems to supplement fast device controls,
(c) in user programs providing user level threads, and
(d) in implementing concurrency on single tasking systems such as device drivers and spooling utilities.

While my above description contains many specifications, these should not be construed as limitations on the scope of the invention, but rather an exemplification of one preferred embodiment thereof.

Accordingly, the scope of the invention should be determined not by embodiments illustrated, but by the appended claims and their legal equivalents.

I claim:
1. A method for concurrency on a digital computer having a memory, devices, driver softwares, and user softwares, wherein each of said devices having busy period and idle period in turn, each of said user softwares having a user context and means for issuing a request to a driver software selected from said driver softwares, said request having
    a user context save area,
    a driver context save area, and
    a driver context area in said memory, and
    a request identifier that identifies said request, said driver software having critical regions, and each of said critical regions having a request identifier storage area for storing predetermined number of said request identifier in memory, comprising steps of (a)
  receiving said request,
  saving said user context into said user context save area,
  making a driver context from said driver context area,
  driving said devices, and
  restoring said user context from said user context save area, (b)
  detecting said start of busy period of said devices,
  saving said driver context into said driver context save area, and
  restoring said user context from said user context save area, (c)
  detecting said start of idle period of said devices,
  saving said user context into said user context save area, and
  restoring said driver context from said driver context save area, (d)
  detecting said start of each of critical regions,
  adding said request identifier to said request identifier storage area, and
  detecting said area having more than one member,
    saving said driver context into said driver context save area, and
    restoring said user context from said user context save area, and (e)
  detecting said end of each of critical regions,
  removing said request identifier from said request identifier storage area, and
  detecting said area having at least one member,
    selecting a stored request identifier from said request identifier storage area,
    saving said user context into the user context save area of the request identified by said stored request identifier, and
    restoring said driver context from the driver context save area of the request identified by said stored request identifier, whereby said user softwares operating concurrently with said devices.

2. Apparatus on a digital computer having a memory, devices, driver softwares, and user softwares, wherein
  each of said devices having busy period and idle period in turn,
  each of said user softwares having a user context and means for issuing a request to a driver software selected from said driver softwares,
  said request having
    a user context save area,
    a driver context save area, and
    a driver context area in said memory, and
    a request identifier that identifies said request,
  said driver software having critical regions, and
  each of said critical regions having a request identifier storage area for storing predetermined number of said request identifier in memory, comprising means for (a)
  receiving said request,
  saving said user context into said user context save area,
  making a driver context from said driver context area,
  driving said devices, and
  restoring said user context from said user context save area, (b)
  detecting said start of busy period of said devices,
  saving said driver context into said driver context save area, and
  restoring said user context from said user context save area, (c)
  detecting said start of idle period of said devices,
  saving said user context into said user context save area, and
  restoring said driver context from said driver context save area, (d)
  detecting said start of each of critical regions,
  adding said request identifier to said request identifier storage area, and
  detecting said area having more than one member,
    saving said driver context into said driver context save area, and
    restoring said user context from said user context save area, and (e)
  detecting said end of each of critical regions,
  removing said request identifier from said request identifier storage area, and
  detecting said area having at least one member,
    selecting a stored request identifier from said request identifier storage area,
    saving said user context into the user context save area of the request identified by said stored request identifier, and
    restoring said driver context from the driver context save area of the request identified by said stored request identifier, whereby said user softwares operating concurrently with said devices.

* * * * *